May 1, 1934.  C. R. SHORT  1,957,111

BEARING

Original Filed Sept. 22, 1927

Inventor
Charles R. Short.
By Spencer Hardman & Fehr
his Attorneys

Patented May 1, 1934

1,957,111

UNITED STATES PATENT OFFICE 1,957,111

BEARING

Charles R. Short, Clermont, Fla., assignor, by mesne assignments, to General Motors Corporation, Detroit, Mich., a corporation of Delaware Original application September 22, 1927, Serial No. 221,340, now Patent No. 1,819,272, dated August 18, 1931. Divided and this application October 8, 1930, Serial No. 487,138

2 Claims. (Cl. 308—237)

This invention relates to machine elements having surfaces adapted to be placed in rubbing contact with a relatively movable part, such as a bearing for a shaft.

It has been heretofore found desirable to employ porous metallic material as a bearing surface in elements of this character, and to secure this porous metallic material to a backing or reinforcing member of denser metal, by means of a metallic bond between the porous and denser members, said bond alloying with the porous and denser metals to securely attach said metals together. Under certain conditions as, for instance, when the machine element becomes highly heated, the bond may be wholly or partially broken down due to a tendency of the porous material to absorb the bonding material when hot, thus permitting the porous bearing surface to become loose.

It is the primary object of this invention to provide a novel and improved machine element of this character in which the porous metallic bearing surface is securely attached to the reinforcing member in such a way that it will remain so attached during all conditions of manufacture and operation.

It is also a further object of this invention to devise a novel method of making machine elements of the type described in which the bearing surface is attached to the reinforcing member in an improved manner.

With these objects in view, one feature of the invention consists in the provision of a machine element having a porous metallic bearing surface, secured directly to a denser metal reinforcing member, without the use of any intermediate bonding material.

A further feature of the invention consists in a method of making such a machine element in which the step of attaching the porous bearing surface to the denser metal back consists in heating the two metal elements to a high temperature while clamped together under pressure. The invention also contemplates the heating of the elements clamped together as described in a liquid bath.

This application is a division of Serial Number 221,340 filed September 22, 1927, Patent No. 1,819,272 ssued August 18, 1931.

Further objects and advantages of the present invention will be apparent from the following description, reference being had to the accompanying drawing, wherein a preferred embodiment of one form of the present invention is clearly shown.

In my prior Patent No. 1,768,529, issued June 24, 1930 and my Patent No. 1,834,746 issued December 1, 1931, I have disclosed bearings having a facing consisting of a thin sheet of porous metallic material, secured to a reinforcing backing of denser metal having a greater tensile strength, and certain methods of making such bearings. The porous metallic element employed in such bearings has been either such an element as described in the patent to H. M. Williams et al. Number 1,642,347, issued September 13, 1927, or such an element as described in my above mentioned Patent No. 1,834,746. The porous metallic element described in the Williams patent is of substantially the same porosity throughout, while that disclosed in my Patent No. 1,834,746 is of laminated construction having layers which differ in degree of porosity. The methods employed to make these metallic elements form no part of this invention and need not be described in detail herein. Briefly, it may be said that the metallic element disclosed in the Williams patent is made by briquetting a mixture of metal powders, a filler such as graphite, and a volatile void forming substance such as salicylic acid and sintering the briquette at proper temperature. The metal element disclosed in my Patent No. 1,834,746 is made by adding a layer, principally copper or copper alloy to the porous metallic element disclosed in the Williams patent.

Figure 1:
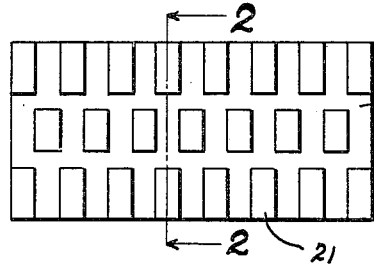
Fig. 1 is a plan view of a preferred form of porous metallic plate.
Figure 2:
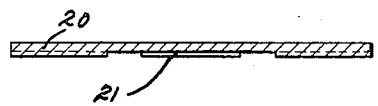
Fig. 2 is an enlarged sectional view on the line 2—2 of Fig. 1.

In Fig. 1 of the drawing, is disclosed a metallic element 20 which is of novel and improved form to give the best results when bonded directly to the reinforcing member without use of an intermediate metal bond such as tin, which has been formerly employed in making bearings with a porous metallic facing. It has been found that when the porous metallic facing is secured directly to the denser metal backing, particularly by electrically welding as set forth hereinafter, better results are obtained if a portion only of the two contacting surfaces are bonded. The metal element 20 according to the present invention is formed with an embossed surface, having areas 21 projecting above the remaining surface of said metallic element. The element is embossed in any suitable manner, for example, by pressing with a die of proper shape to secure the desired formation. It will be understood also that the raised areas 21 may be formed from the body of the metallic element as the element itself is formed, or may be formed thereon at a subsequent operation. The projecting areas 21 are joined to a reinforcing member of a denser metal in the manufacture of a bearing as later described.

The metallic element described may be of substantially the same degree of porosity throughout or may be an element having the laminated construction described in my above mentioned patent No. 1,834,746. It is more desirable to use the laminated form of metallic element and form the projecting areas 21 on the less porous metallic layer, for the reason that the less porous layer has greater tensile strength than the more porous metallic layer, and when attached to the denser metal reinforcing member, a stronger bond is formed which will require a greater force to break it down, than if the more porous material were secured to the reinforcing member. As set forth previously and more fully explained later, a more desirable bond is secured when a metal element having an embossed surface is secured directly to its reinforcing back by welding or heating to high temperatures, but it will be understood that these methods of bonding are not limited to the use of the embossed element, and may be employed to attach two plane surfaces together also.

This invention contemplates the bonding of the element 20 to a denser metal reinforcing member by the application of heat. To secure a bond in this manner the element 20 and the reinforcing member are clamped together in any suitable manner under comparatively light pressure and are heated while so held to a temperature of 1525° to 1550° F. and are then quickly cooled. This temperature will depend on the materials used.

The clamped assembly may be heated in any desirable manner, and satisfactory results have been obtained when said assembly is heated in a bath of molten salts.

The porous material may be composed of copper and an alloy of copper and other substances. When the porous material is heated while held in contact with the denser metal backing to the temperature referred to, a part of this alloy of copper and other substances melts, but the specified temperature is less than the melting point of copper. On cooling the melted portion of the alloy forms a bond attaching the porous metal to its reinforcing body.

It is also within the scope of this invention to effect the joinder of a porous metallic element to a denser metal member by heating to high temperatures by means of an electric current to electrically weld the two elements together. In accordance with this method of bonding the two elements, the porous element is held against the member to which it is to be attached, with the projecting areas 21 in contact therewith. One conductor of an electric circuit is in electrical connection with the reinforcing member, while the other conductor of said circuit is in connection with an electrode which is brought into engagement with the exposed surface of the porous element.

Figure 3:
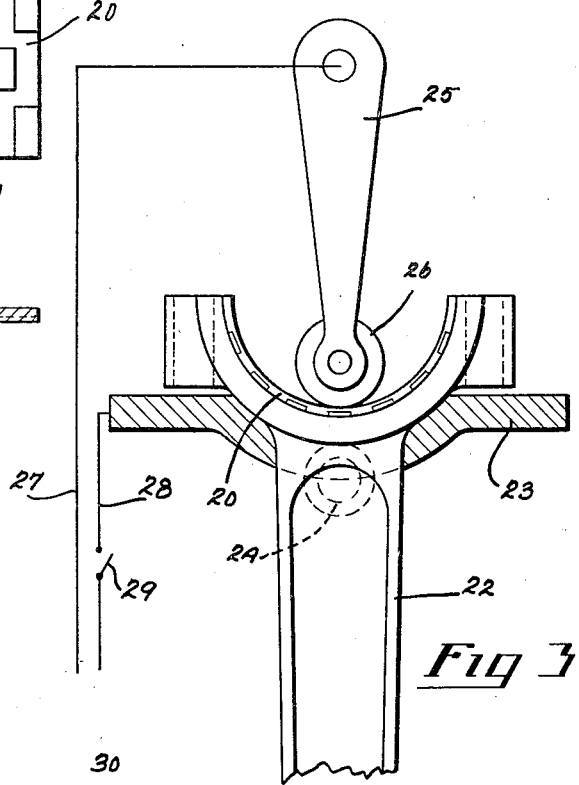
Fig. 3 is a sectional view, largely diagrammatic, of apparatus used to weld the porous metallic plate to a reinforcing member, for example a connecting rod.

In Fig. 3 is disclosed diagrammatically a suitable apparatus for effecting joinder of the two metallic elements by electric welding. The apparatus disclosed is designed to weld a porous metallic element of curved form to the curved surface of a connecting rod bearing. As disclosed a connecting rod 22 is supported on a supporting cradle 23 having a hole therein through which the rod extends. The cradle is pivoted at 24 so as to have a rocking movement. The porous element 20 is placed in the curved end of the rod 22, with the projecting surfaces 21 in contact with the surface of the connecting rod. An electrode 25 having a roller 26 adapted to engage the upper surface of the metallic element 20 is supported above such element and is adapted to be brought into engagement therewith by any suitable means so as to press the element 20 into engagement with the connecting rod with a moderate pressure. A conductor 27 constituting one branch of an electric circuit connects the electrode with a suitable source of electrical energy, while a conductor 28 connects the cradle 23 with such source of energy, a switch 29 being provided to make and break the circuit as desired.

When the electrode is in such position as to hold the element 20 against the adjacent surface of the connecting rod the switch is closed and the cradle is rocked to bring the roller 26 above the projections 21 successively. As the roller successively comes above the areas 21, a positive contact is established at such areas and they are welded to the rod 23. By using a metallic element having raised surfaces a higher temperature is possible at the contacting surfaces with a given current and a better weld is secured than if it be attempted to weld one plane element to another throughout their entire contacting areas.

While apparatus is shown for carrying out this method in the making of curved bearings only, it is obvious that said method can be employed in the manufacture of flat bearings. In making such bearings, instead of using a pivoted cradle such as 23, a cradle having lateral movement with respect to the electrode 25 could be employed.

Figure 4:
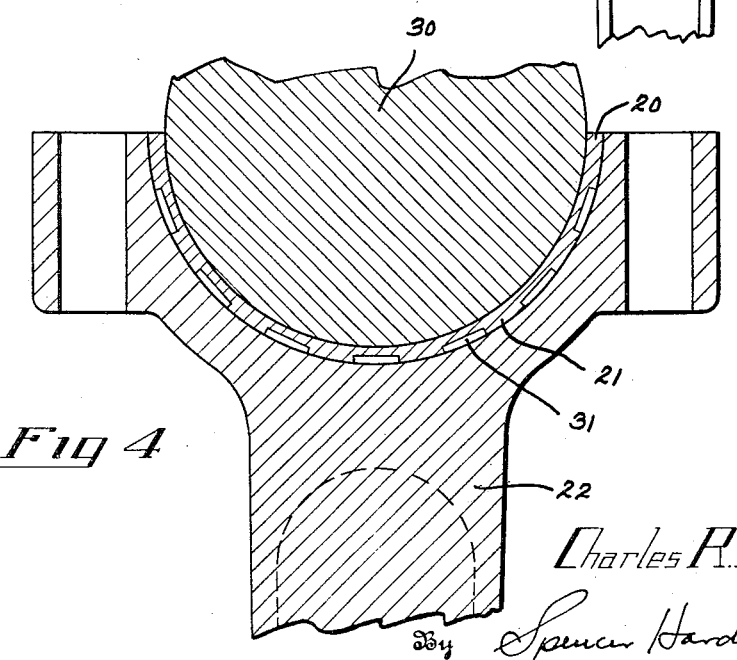
Fig. 4 is an enlarged fragmentary section of a connecting rod bearing formed according to this invention.

In Fig. 4 is disclosed a connecting rod assembly having a facing of porous material bonded to the steel rod. An element 20 is shown between the rod 22 and the cooperating crank shaft 30.

In Fig. 4, which is on an enlarged scale, it will be seen that between the projections 21 are channels 31 which are formed when said projections are formed on the element 20. These projections will serve as oil channels for any oil which comes in contact with the bearing, permitting any such oil to reach a considerable part of the bearing surface. Obviously such oil will be more readily absorbed than if the porous element 20 had a plane surface thereof secured to the reinforcing member, so that any oil reaching the bearing would have to be absorbed by said element 20 through the ends thereof.

While the form of embodiment of the present invention as herein disclosed, constitutes a preferred form, it is to be understood that other forms might be adopted, all coming within the scope of the claims which follow.

What is claimed is as follows:

1. A bearing comprising a relatively strong metal back and an oil impregnated porous bronze bearing lining therefor, said lining having a series of relatively small raised areas on its surface contacting with said metal back, said raised areas being welded directly to said back.

2. A bearing comprising a relatively strong metal back and an oil impregnated porous bronze bearing lining therefor, said lining having alternate raised and depressed areas on its surface contacting with said back, said raised areas being welded to said back and said depressed areas forming oil chambers for supplying oil to the bearing surface of the bearing through the pores in said porous lining.

CHARLES R. SHORT.